Figure 1:
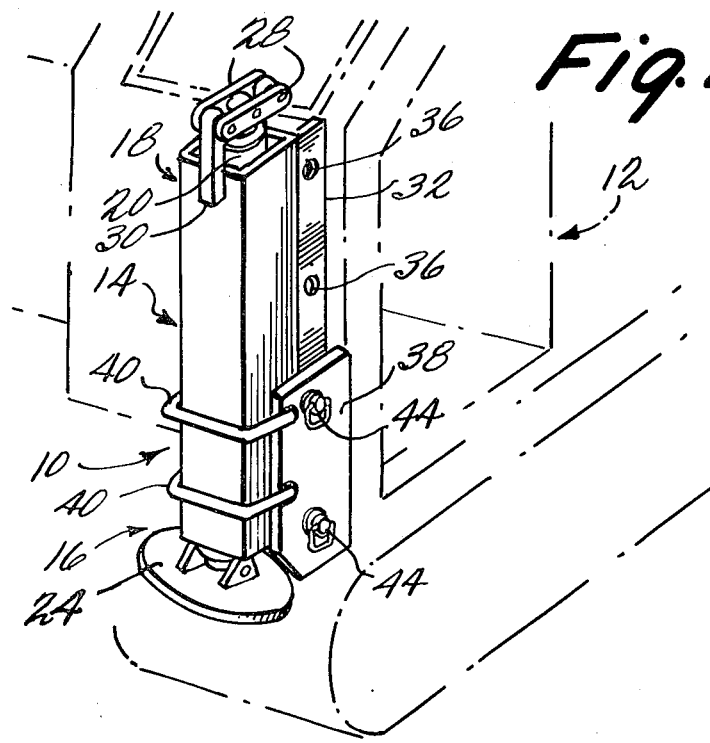

United States Patent [19]

Linton et al.

[11] 4,176,824

[45] Dec. 4, 1979

[54] LIFTING APPARATUS

[76] Inventors: Francis E. Linton, 207 Oak La. S.W., Glen Burnie, Md. 21061; Richard Lewis, 630 Markham Rd., Baltimore, Md. 21229

[21] Appl. No.: 893,274

[22] Filed: Apr. 5, 1978

Related U.S. Application Data

[63] Continuation of Ser. No. 766,513, Feb. 7, 1977, abandoned.

[51] Int. Cl.² ............................................. B60S 9/08
[52] U.S. Cl. ................................................. 254/86 R
[58] Field of Search ................... 254/86 R, 86 M, 45, 254/134, 93 VA

[56] References Cited

U.S. PATENT DOCUMENTS

| | | | |
|---|---|---|---|
| 1,957,151 | 5/1934 | Pollard | 254/93 VA |
| 3,148,795 | 9/1964 | Leach | 254/45 |
| 3,183,581 | 5/1965 | Lister | 254/134 |
| 3,275,298 | 9/1966 | Hand | 254/45 |
| 3,595,527 | 7/1971 | Douglass | 254/86 R |

Primary Examiner—Robert C. Watson
Attorney, Agent, or Firm—Cushman, Darby & Cushman

[57] ABSTRACT

Lifting apparatus in which a hydraulic cylinder-piston unit is adjustably mounted on a vehicle or other object to be lifted by replaceable pins to facilitate rapid changes in position of the unit to accommodate varying distances between the object and the surface above which it is to be supported.

5 Claims, 4 Drawing Figures

LIFTING APPARATUS

This is a continuation, of application Ser. No. 766,513 filed Feb. 7, 1977, now abandoned.

This invention pertains to lifting apparatus, and particularly to such apparatus useful for the jacking up of a vehicle when leveling and/or supplemental support of it is desirable.

Several types of vehicles are now in service, such as cranes and hole boring machines, which require support by external jacking apparatus so that the vehicle is level, and/or supplemental support outboard of the wheels or tracks of it is provided to avoid tipping over.

The particular object of this invention is to provide lifting apparatus of the aforesaid type which is readily adjustable into a carrying position and into a plurality of operating positions. The latter feature is to permit a unit according to the invention to be operative for different circumstances wherein differing distances exist between the object to be lifted, e.g., a vehicle, and a surface above which it is placed, e.g., the surface of the ground or pavement over which the object is positioned.

Figure 2:
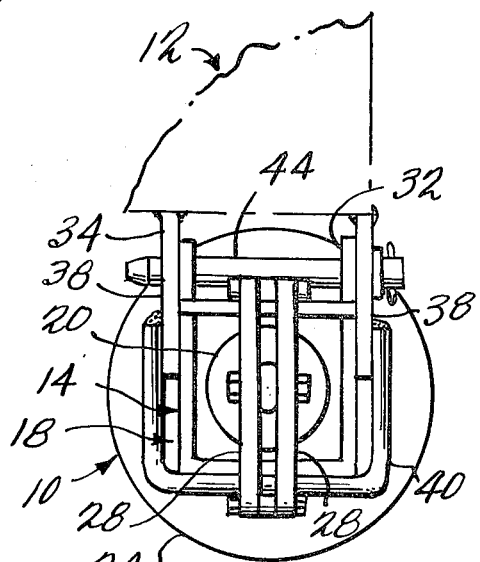
Figure 3:
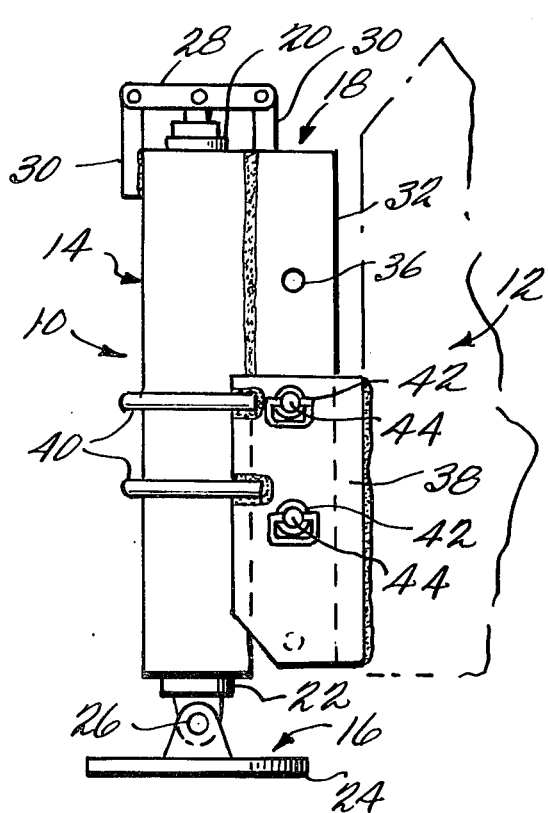
Figure 4:
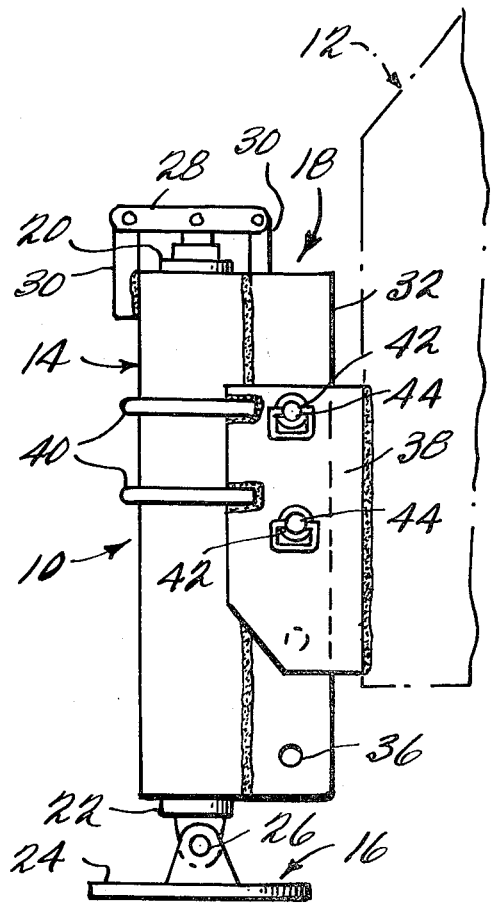

An illustrative embodiment of the invention is shown in the accompanying drawing and the detailed description which follows. In the drawing:

FIG. 1 shows a general view of the illustrative embodiment attached to a vehicle, FIG. 2 shows a top view of the illustrative embodiment, FIG. 3 shows a side view of the illustrative embodiment in a raised position, and FIG. 4 shows a side view of the illustrative embodiment in a lowered position.

With reference to the drawing, the lifting apparatus designated generally as 10 is shown with a vehicle 12 (in chain line) as the object to be lifted. A main component of the lifting apparatus is an extendable device 14 having a first or lower end 16 for engaging the ground or other surface, and a second or upper end 18 for connection to the vehicle. Device 14 is an elongated hollow structure in which a hydraulic cylinder of conventional type is positioned. The cylinder, designated 20, has its piston rod 22 terminating in a pad 24 mounted by pin 26 to adapt to non-level surfaces. The usual hydraulic line connections (not shown) will be used to actuate the piston up and down within the cylinder. The upper end of cylinder 20 is mounted by cross bars 28 to posts 30 which are welded to two sides of device 14.

Extendable device 14 has a portion thereof extending to one side and constituted by rails 32 and 34. A plurality of aligned apertures 36 are provided in rails 32 and 34, the apertures 36 being spaced apart equal distances from one another.

A fixture made up of two side-by-side plates 38 and two bails 40 is fastened to the vehicle, as by welding plate 38 to the vehicle. The bails 40 encircle the device 14 so that the latter may be retained by the fixture but readily moved up and down in the fixture. The side plates 38 are provided with two sets of aligned apertures 42 through which pins 44 may be inserted. The apertures 42 are spaced apart the same distance as the spacing of apertures 36, wherefore pins 44 may be passed through the apertures 42 and also a set of apertures 36, thusly enabling the mounting of the extendable device in the fixture at various positions.

When not in use, as when the vehicle is en route to a job site, pins 44 may be placed in the lowermost pair of apertures 36, to raise the device 14 up and clear of the ground. Upon parking the vehicle at the job site, the device 14 may be lowered as required to permit the pad 24 to engage the ground somewhere in the range of extension of the piston rod 22, and pins 44 placed in the nearest set of apertures 36 that will coincide with apertures 42.

The invention thusly permits the use of a hydraulic cylinder-piston device, or other extendable device, of given range of extension, over a wider range of distances from the vehicle to the ground than otherwise could be realized from the extendable device. In this way the use of unusually long hydraulic cylinders is avoided, with long piston rods that would not afford adequate stability against lateral shifting forces.

The foregoing embodiment of the invention is described only for purposes of illustration, and the true scope of the invention is to be determined from the appended claims.

What is claimed is:

1. Apparatus for lifting an object relative to a surface comprising,
   (a) an extendable device having an elongated body terminating at a first end fitted with means for engaging the surface and terminating at a second end,
   (b) mounting means attached to the second end and offset from the body of the extendable device for adjustably mounting the second end of the extendable device on the object, and having an apertured support portion,
   (c) a fixture on the object for slidably receiving the mounting means therein, including two spaced apart structural members receiving said apertured portion therebetween,
   (d) at least two apertures through the mounting means apertured portion in a direction at right angles to the lengthwise dimension of the elongated body of the extendable device and in a direction not intersecting the position of the extendable device,
   (e) at least two apertures through each spaced apart structural member of the fixture in a direction to align with the apertures through the mounting means apertured portion,
   (f) a pair of readily removable pins each passed through an aperture in each of the fixture structural members and an aligned aperture of the mounting means apertured portion, and
   (g) one or both of (i) each of the fixture structural members and (ii) said mounting means apertured portion, having a plurality of apertures therethrough to permit adjustable mounting of the mounting means in the fixture by use of said pins through aligned apertures of the fixture and mounting means so that the extendable device may be mounted in the fixture at various positions for accommodating various distances between the object and the surface, whereby an extendable device may be employed which is extendable for a distance less than would be required if the mounting means were permanently fixed to the object.

2. Apparatus as recited in claim 1 wherein said fixture further includes a pair of bails extending outwardly from said spaced apart structural members and encircling said mounting means.

3. Apparatus as recited in claim 1 wherein said apertured portion of said mounting means comprises a pair of parallel rails spaced apart a distance slightly less than the distance said structural members of said fixture are spaced apart, so that said rails will be received by and be in abutting contact with said structural members.

4. Apparatus as recited in claim 3 wherein said structural members comprise a pair of plates, and wherein a pair of bails extend outwardly from each of said plates and encircle said mounting means.

5. Apparatus as recited in claim 4 wherein said mounting means comprises a tubular member having a generally quadrate cross-section, said rails comprising continuations of side walls of said tubular member.

* * * * *